(12) United States Patent
Berger et al.

(10) Patent No.: US 12,476,504 B2
(45) Date of Patent: Nov. 18, 2025

(54) DEVICE FOR WINDING OR UNWINDING A LINE

(71) Applicant: Conductix Wampfler France, Belley (FR)

(72) Inventors: Jean-Michel Berger, Brens (FR); Bruno Parseihian, Magnieu (FR); Yohan Fournier, Sermerieu (FR)

(73) Assignee: Conductix Wampfler France, Belley (FR)

( * ) Notice: Subject to any disclaimer, the term of this patent is extended or adjusted under 35 U.S.C. 154(b) by 226 days.

(21) Appl. No.: 17/925,874

(22) PCT Filed: May 18, 2021

(86) PCT No.: PCT/FR2021/050865
§ 371 (c)(1),
(2) Date: Nov. 17, 2022

(87) PCT Pub. No.: WO2021/234272
PCT Pub. Date: Nov. 25, 2021

(65) Prior Publication Data
US 2023/0192440 A1 Jun. 22, 2023

(30) Foreign Application Priority Data
May 19, 2020 (FR) ....................... 2005124

(51) Int. Cl.
*H02K 1/27* (2022.01)
*B65H 75/44* (2006.01)
(Continued)

(52) U.S. Cl.
CPC ....... *H02K 1/2795* (2022.01); *B65H 75/4486* (2013.01); *H02K 7/003* (2013.01);
(Continued)

(58) Field of Classification Search
CPC ........ H02K 1/2795; H02K 7/003; H02K 7/14; H02K 21/24
See application file for complete search history.

(56) References Cited

U.S. PATENT DOCUMENTS 4,876,471 A 10/1989 Lacour
2008/0278020 A1* 11/2008 Ley ...................... H02K 21/222
310/156.01
(Continued)

FOREIGN PATENT DOCUMENTS

EP 2481701 A1 8/2012
EP 3008005 B1 3/2019
(Continued)

OTHER PUBLICATIONS

Amin, S. et al., "A Comprehensive Review on Axial Flux Machines and Its Applications," 2019 2nd International Conference on Computing, Mathematics and Engineering Technologies (iCoMET), IEEE, XP033532355, Jan. 30, 2019, pp. 1-7.
(Continued)

*Primary Examiner* — Terrance L Kenerly
(74) *Attorney, Agent, or Firm* — Ryan T. Grace; Advent, LLP

(57) ABSTRACT

The invention relates to a device for winding/unwinding a link adapted to transporter a fluid or transmit energy and/or signals, comprising:
  a reel (2) adapted to receive said link in wound form,
  a hollow through shaft (3) adapted to the passage of said link or fluid between a rotating joint and the reel, said hollow shaft (3) being integral with the reel (2) in order to drive said reel in rotation about a longitudinal axis (X) of said shaft,
  at least one permanent magnet synchronous direct drive motor, comprising a stator carrying windings (10)
(Continued)

adapted to be electrically three-phase powered and a rotor carrying the permanent magnets (11) facing windings (10) of the stator.

13 Claims, 5 Drawing Sheets

(51) Int. Cl.
    *H02K 1/2795*     (2022.01)
    *H02K 7/00*     (2006.01)
    *H02K 7/14*     (2006.01)
    *H02K 11/33*     (2016.01)
    *H02K 21/24*     (2006.01)
    *G02B 6/44*     (2006.01)
    *H02G 11/02*     (2006.01)

(52) U.S. Cl.
    CPC ............... *H02K 7/14* (2013.01); *H02K 11/33* (2016.01); *H02K 21/24* (2013.01); *B65H 2701/30* (2013.01); *G02B 6/4457* (2013.01); *H02G 11/02* (2013.01)

(56) References Cited

U.S. PATENT DOCUMENTS

| | | | |
|---|---|---|---|
| 2012/0247579 A1 | 10/2012 | Park | |
| 2016/0122155 A1* | 5/2016 | Bauck | B65H 75/4489 242/390.8 |

FOREIGN PATENT DOCUMENTS

| | | | | |
|---|---|---|---|---|
| EP | 3072220 | B1 | 2/2020 | |
| FR | 2102600 | A5 | 4/1972 | |
| FR | 2603270 | * | 3/1988 | ......... B65H 75/4486 |
| FR | 2607333 | A1 | 5/1988 | |
| FR | 2899399 | A1 | 10/2007 | |
| GB | 1362423 | A | 8/1974 | |
| JP | 1983031873 | A | 2/1983 | |
| JP | 1999299201 | A | 10/1999 | |
| JP | 2006027894 | A | 2/2006 | |
| JP | 2011250585 | A | 12/2011 | |
| JP | 2018166353 | A | 10/2018 | |
| RU | 2362687 | C1 | 7/2009 | |
| SU | 1157579 | A1 | 5/1985 | |
| WO | 2009058048 | A1 | 5/2009 | |

OTHER PUBLICATIONS

International Search Report for Application No. PCT/FR2021/050865, dated Aug. 27, 2021.
Preliminary Search Report for Patent Application No. FR2005124, dated Jan. 28, 2021.
Office Action in Japan for Patent Application No. 2022-566327, dated Feb. 12, 2025.
Office Action for Russian Application No. 2022132144/07(070079) dated Oct. 4, 2024.

* cited by examiner

DEVICE FOR WINDING OR UNWINDING A LINE

TECHNICAL FIELD

The invention relates to a device for winding/unwinding a link adapted to transport a fluid or transmit energy and/or signals.

PRIOR ART

There are many industrial applications wherein it is necessary to transmit energy and/or signals (for example, an electric current, optical signals, a mechanical tension, a fluid, etc.) via a rotary connection between a first element and a second element mobile with respect to the first element. For example, the first element can be a cabinet fixed to the ground, a frame of a robot, etc. and the second element can be a carriage or a travelling gantry on the ground, an arm of a robot, etc.

The aforementioned energy and/or signals are transmitted via an electric cable, an optical fibre or a bundle of optical fibres, a mechanical cable, a hydraulic or pneumatic conduit or any other suitable means, generally designated in the present text by "link".

In order to prevent the link from being deployed in a disorderly manner during the displacement of the second element in relation to the first element, it is known to arrange the link on a reel of a winder mounted on the first or the second element and comprising a drive unit adapted to drive the reel in rotation, in such a way as to unwind or wind said link in a synchronised manner with the displacement of the second element in relation to the first element. Such a winding device is for example described in EP3008005.

A winder has to be adapted at close as possible to the applications for which it is used, the latter being highly varied. Depending on the link, the height of the installation, the speeds and accelerations of displacement of the second element with respect to the first element, the sizing of the drive unit has to be adapted.

A particularity with winders is the low rotation speed of the reel but the necessity of delivering a substantial torque.

There are different types of drive units intended to respond to these technical constraints.

A first type of drive unit comprises the association of a motor with a magnetic coupler, such as described for example in documents FR2102600, FR2607333 and FR2899399. This conception authorises a certain modularity from identical motors and couplers, in that several motor coupler sets can be mounted on the same gearbox in order to adjust the torque according to the application.

A second type of drive unit comprises the association of a variable frequency motor and an electronic control unit. This type of drive unit does not benefit from the modularity of the first type in that the motor has to be chosen with the power required for the application. Another type of drive unit is an axial flux motor such as for example described in EP3072220.

BRIEF DESCRIPTION OF THE INVENTION

A purpose of the invention is to design a new type of drive for a winder, making it possible to procure a high torque at low speed.

To this effect, the invention proposes a device for winding/unwinding a link adapted to transporter a fluid or transmit energy and/or signals, comprising:

- a reel adapted to receive said link in wound form,
- a hollow through shaft adapted to the passage of said link or fluid between the rotating joint and the reel, said hollow shaft being integral with the reel in order to drive said reel in rotation about a longitudinal axis of said shaft,
- at least one permanent magnet synchronous direct drive motor, comprising a stator carrying windings adapted to be electrically three-phase powered and a rotor carrying the permanent magnets facing windings of the stator.

In some embodiments, at least one rotor of said at least one motor is formed by a central disc of the reel.

In other embodiments, at least one rotor of said at least one synchronous motor is rigidly integral with the shaft. In some embodiments the permanent magnets are arranged through said at least one rotor in such a way as to each have a north face on one side of said rotor and a south face on the opposite side of the same rotor.

In some embodiments, each permanent magnet has a trapezoidal shape, the height of each permanent magnet extending radially with respect to the longitudinal axis. Particularly advantageously, the magnets are juxtaposed in order to form a crown.

In some embodiments, the radial extension of the crown of magnets is substantially equal to the height of the windings.

In a preferred embodiment, the motor is with axial flux.

The device can furthermore include an electronic speed variator adapted to vary the supply current of the windings of the stator. The device advantageously further comprises a rotating joint coupled to an end of the hollow shaft opposite the reel and a control/command system comprising a processing unit coupled or integrated to the electronic speed variator top control each motor according in particular to the position of the winder and the operating phase.

BRIEF DESCRIPTION OF THE DRAWINGS

Other characteristics and advantages of the invention shall spear in the following detailed description, in reference to the accompanying drawings, wherein.

Only the elements required for the description of the winder were shown. The reference signs that are identical from one figure to another designate elements that are identical or that fulfil the same function, and therefore will not necessarily be described in detail again.

DETAILED DESCRIPTION OF EMBODIMENTS

Figure 1:
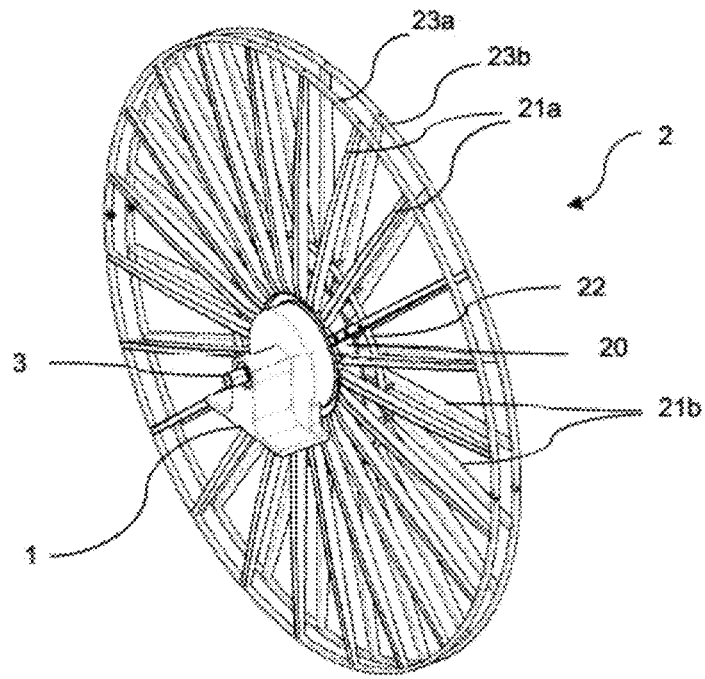
FIG. 1 is a general view of a winding/unwinding device according to an embodiment of the invention.

FIG. 1 is a general view of a device for winding/unwinding a link according to an embodiment of the invention.

The link can be an electric cable, an optical fibre or a bundle of optical fibres, a mechanical cable, a hydraulic or pneumatic conduit or any other suitable means for transmitting energy and/or signals.

For reasons of legibility of the figures, the rotary joint, the control/command device and the elements connected by the link were not shown.

One of these elements can be, in particular but in a non-limiting manner, a cabinet fixed to the ground or a frame of a robot.

The other of these elements can be, in particular but in a non-limiting manner: a carriage or a travelling gantry on the ground, or an arm of a robot.

The winding/unwinding device (also called "winder" in the rest of the text) comprises a support which is adapted to be rigidly integral with one of the elements.

The winder also comprises a reel 2 adapted to receive the link in wound form.

The reel comprises:
a mandrel 20 extending along an axis of rotation of the reel, and
two sets of lateral arms 21a, 21b defining a winding volume of the link, adapted to laterally contain the turns of said link, fixed on either side of the mandrel 20. Each set of arms forms a flange.

Alternatively (not shown), the flanges of the reel can be solid, each set of arms being replaced with a disc of equivalent diameter.

The structure of the reel is rigidified by ferrules, which can be an integral part of the mandrel or of the flanges, namely:
an interior ferrule 22, located at a first distance from the mandrel, and
a pair of exterior ferrules 23a, 23b wherein each ferrule is fixed to at least one arm of a respective flange at a second distance from the mandrel, greater than the first distance.

The reel comprises a bearing surface adapted to receive the turns of the link, the interior turn being in contact with said bearing surface. Said bearing surface can in particular be part of the mandrel or of the interior ferrule.

The inter-flange space, i.e. the distance between the two flanges, is defined according to the width of the link to be wound on the reel. In order to allow for a correct winding/unwinding of the link, in particular in the case of a single-turn reel, the inter-flange space is adjusted so that the distances between the flanges are adapted to the link wound at the proximal and distal ends of the arms.

The inter-flange space and the length of the arms, which define the capacity of the reel, are chosen according to the maximum length of the link susceptible to be wound on the reel. Depending on the applications, the outer diameter of the reel can be typically about 3 to 8 m.

The reel 2 is rigidly integral with an end of a shaft 3 which is mounted mobile in rotation in relation to the support via bearings 30.

Figure 2:
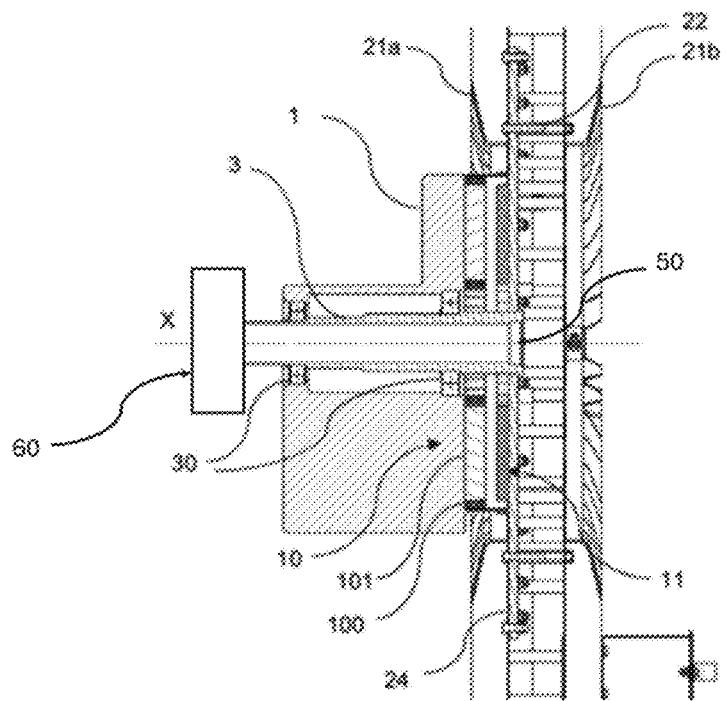
FIG. 2 is a cross-section view of the winding/unwinding device of FIG. 1.

As can be seen better in FIG. 2, the shaft 3 is hollow, in such a way as to allow for the passage 50 of the link between the reel 2 and the rotating joint which is located on the side of the shaft opposite the reel. Thus, the link is protected with regards to elements surrounding the winder and does not risk being damaged by the latter.

In the case where the link transports a fluid, the hollow shaft itself can constitute a conduit for the fluid, unions with the link then being provided at the ends of the shaft.

The end of the hollow shaft opposite the reel is coupled to a hollow shaft of the rotary joint 60 coaxial with the hollow shaft 3.

The shaft and the reel are driven in rotation about the longitudinal axis X of the shaft 3 by at least one permanent magnet synchronous direct drive motor. This type of motor is also called "direct drive motor".

Said at least one motor comprises a stator 1 which is rigidly integral with the support. In the figures, the stator 1 is formed from a single piece with the support, but it could be formed from a separate part rigidly connected to the support.

According to a preferred embodiment, the stator 1 supports a plurality of windings 10 with three-phase power arranged about the axis X in order to produce a magnetic field along the axis X of which the polarity alternates according to the direction of the current passing through the windings. More precisely, the stator 1 comprises a plurality of oriented electrical sheets 100 separated from each other by radial notches and each winding is comprised of a set 101 of turns of electrically conductive wires slid into said notches.

The motor also comprises a rotor mobile in rotation with respect to the stator 1. The rotor supports a plurality of permanent magnets 11.

The turns of the windings 10 are arranged in a substantially radial direction in such a way as to create an axial magnetic field facing permanent magnets 11 of the rotor.

In some embodiments, in reference to FIGS. 2-5, the rotor is constituted by a disc 24 integral with the reel on which the permanent magnets are fixed. Advantageously, said disc can coincide with the mandrel 20.

Figure 3:
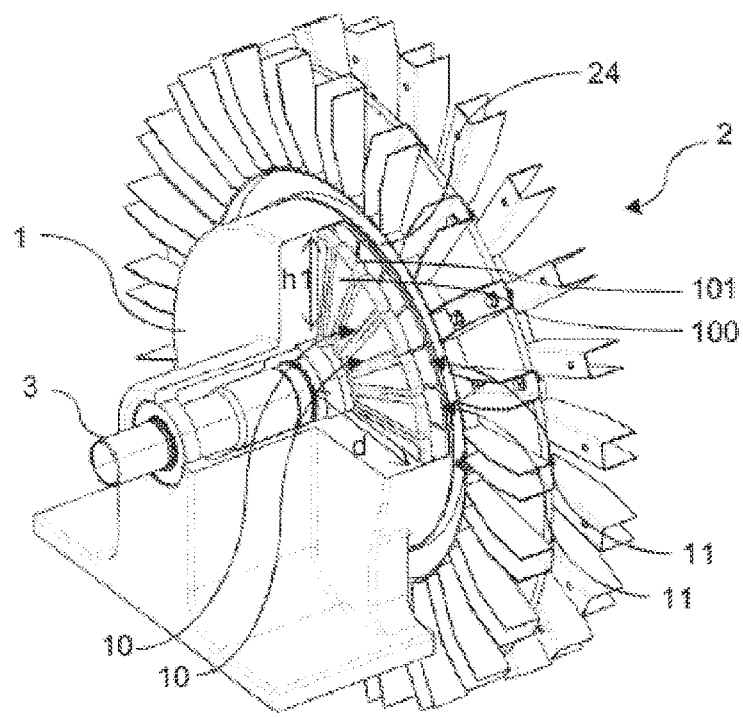
FIG. 3 is a perspective view of the winding/unwinding device of FIG. 1 with a partial cross-section at the motor, according to a first embodiment of the motor.
Figure 4:
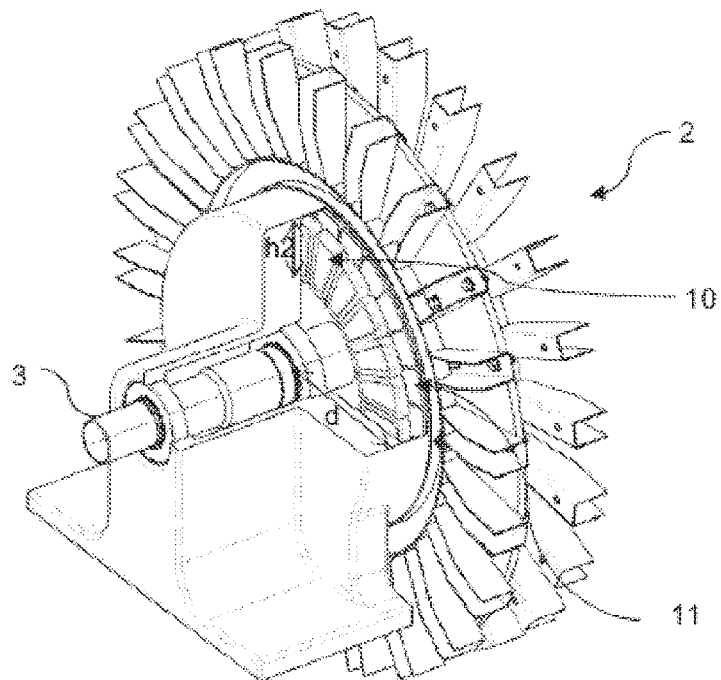
FIG. 4 is a view similar to that of FIG. 3 with a second embodiment of the motor.
Figure 5:
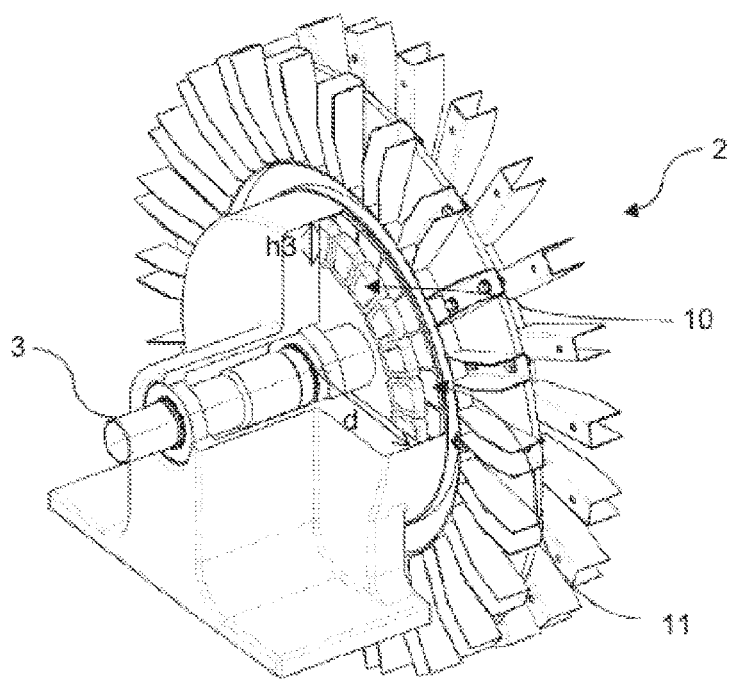
FIG. 5 is a view similar to that of FIGS. 3 and 4 with a third embodiment of the motor.

On order to optimise the surface covered by the magnets, the magnets advantageously have a substantially trapezoidal shape, with a height oriented radially with respect to the axis X, with the narrowest base being positioned closer to the axis X than the widest base. The bases of the magnets can be straight or curved. The permanent magnets can thus be juxtaposed in order to form a crown coaxial with the axis X, facing the windings. Thus, as shown in FIGS. 3 to 5, the stator 1 comprises windings 10 of different heights, and the rotor comprises trapezoidal permanent magnets 11 arranged according to a crown of which the width, which corresponds to the height of the magnets, is preferably less than or equal to the height of the windings (the height of a winding being measured in the radial direction with respect to the axis X).

In other embodiments, in reference to FIGS. 6-10, the rotor 41, 42 comprises a disc on a face of which the permanent magnets 11 are fixed, said disc not being part of the reel 2 but being rigidly integral with the hollow shaft 3. In particular, the rotor can be formed from a single piece with the hollow shaft, or be rigidly fixed to the latter, for example by flutes, pins, or any other means of fastening. The stator 1 is arranged around the rotor 41, 42 and the hollow shaft 3 via bearings 30 that allow for a rotation of the hollow shaft and of the rotor 41, 42 in relation to the stator 1. The stator 1 comprises a surface facing the face of the rotor carrying the permanent magnets, said surface supporting a plurality of windings 101-104 with three-phase power arranged about the axis X to produce a magnetic field along the axis X of which the polarity alternates according to the direction of the current passing through the windings.

More precisely, the stator 1 comprises a plurality of electrical steel sheets separated from one another by radial notches and each winding 101-104 is comprised of a set of turns of electrically conductive wires slid into said notches.

Particularly advantageously, this arrangement of the rotor and of the stator makes it possible to juxtapose several motors along the axis X, each motor associating a face of a rotor carrying the permanent magnets and the face of the stator facing, supporting the windings. Thus, each rotor can be common to two adjacent motors, a first face carrying the permanent magnets belonging to a first motor and a second face, opposite the first and also carrying the permanent magnets, belonging to a second motor. According to this principle, other rotors can be added that, combined with the respective faces of the stator, each contribute to two additional motors.

Figure 6:
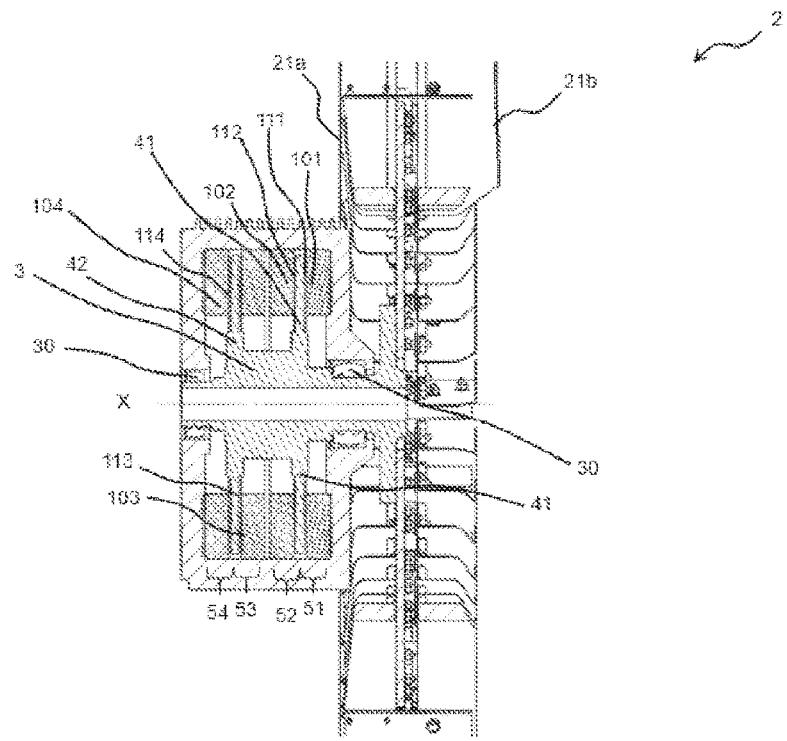
FIG. 6 is a cross-section view of the winding/unwinding device according to another embodiment of the invention.

FIG. 6 thus shows an embodiment with four motors 51-54, comprising two rotors 41, 42 supporting permanent magnets 111-114 on their two faces, each face of a rotor facing a respective face of the stator comprising windings 101-104.

The architecture of FIG. 6 makes it possible to vary the number of motors between 1 and 4, according to the number of faces of the rotors 41, 42 which are provided with permanent magnets and respective stator faces which are provided with windings. Naturally, additional motors could be added by providing one or more additional rotors coaxial with the rotors 41, 42, and respective additional stator faces.

Figure 7:
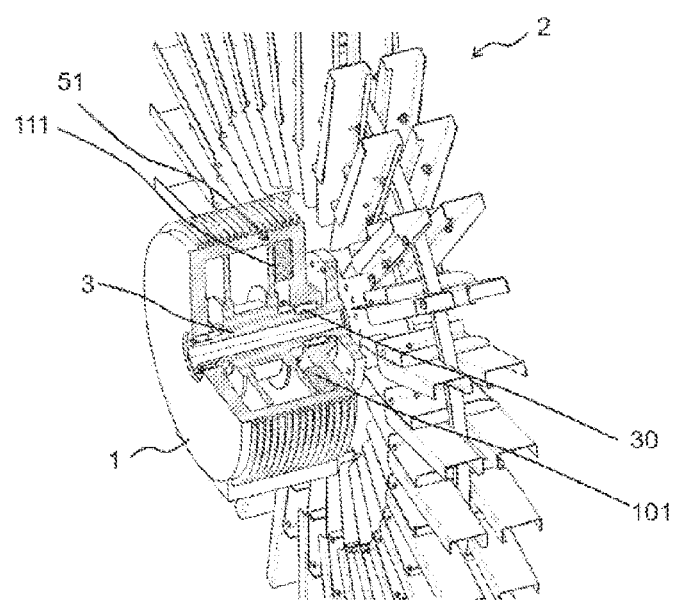
FIG. 7 is a perspective view of a winding/unwinding device according to another embodiment of the invention, with a partial cross-section at the stator.

FIG. 7 shows an embodiment comprising a rotor 41 comprising magnets 111 on a face facing a surface of the stator 1 comprising the windings 101, forming a motor 51. The rotor 41 is rigidly integral with the shaft 3 and coaxial with the reel.

Figure 8:
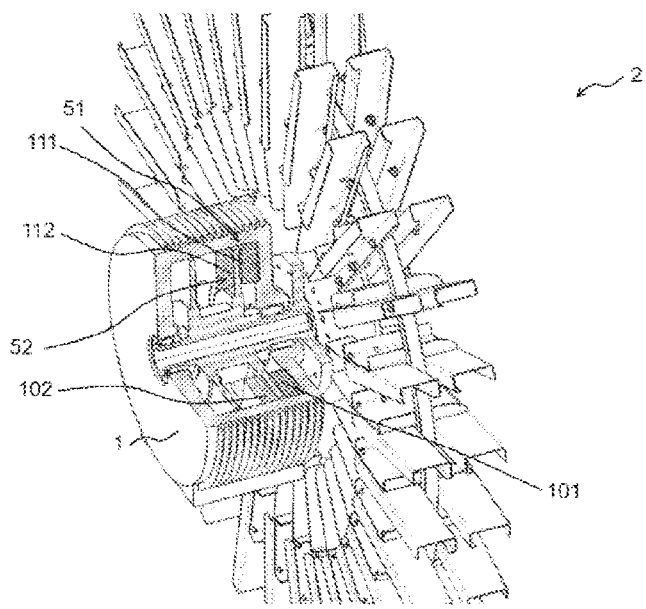
FIG. 8 is a view similar to that of FIG. 7 with two juxtaposed motors.

FIG. 8 shows an embodiment including a rotor 41 comprising magnets 111 on a face facing the surface of the stator 1 including the windings 101, forming a motor 51, and magnets 112 on the opposite face of the rotor 41 facing a second surface of the stator 1 comprising the windings 102, forming a second motor 52.

The magnets can, for example, be glued onto the surfaces of the rotor 41.

Alternatively, a single set of magnets can be used for two adjacent motors. In this case, the magnets are arranged in the rotor 41 in such a way that a magnet has a north face on a first side of the rotor 41 and a south face on the other side of the same rotor 41, and that an adjacent magnet has a south face on the first side of the rotor 41 and the north face on the other side of the rotor 41. In other terms, the north and south faces are alternating on each side of the rotor 41.

The first motor formed by the rotor 41 therefore comprises magnets on a crown, having in an alternating manner a north face and a south face. On the opposite face of the same rotor 41, there is a crown of magnets having the opposite polarity. By offsetting the windings of the stators located on either side of the rotor by a pitch of a magnet, a doubled torque is created with respect to a crown of magnets used on a single side.

Each magnet thus has a face used by the first motor 51, while its opposite face is used by the second motor 52. For example, the rotor 41 can be made from a metal sheet having reservations in the form of magnets, wherein the magnets 111-114 are arranged so as to pass through the rotor 41.

In the embodiments of FIGS. 7 and 8, the rotor 42 is not used to form a motor and therefore does not carry permanent magnets. It would naturally be possible to suppress this rotor 42 so as to increase the compactness of the device.

Figure 9:
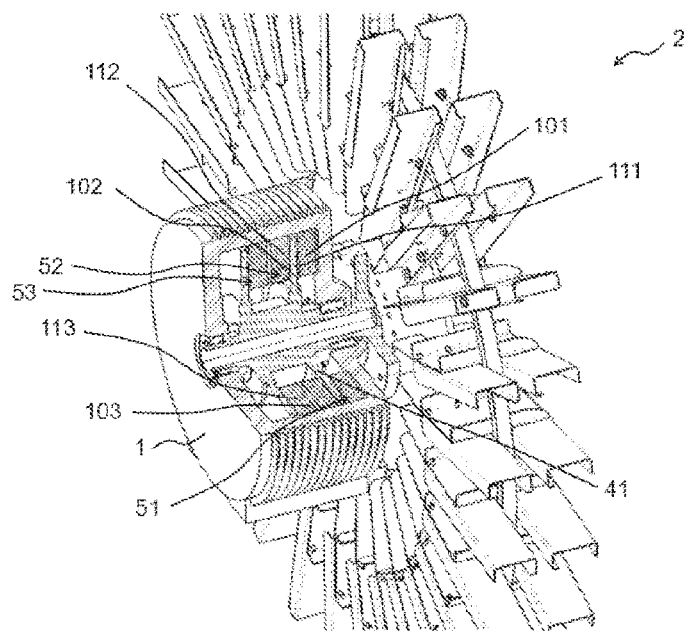
FIG. 9 is a view similar to that of FIGS. 7 and 8 with three juxtaposed motors.

FIG. 9 shows an embodiment comprising the motors 51 and 52 and a second rotor 42 comprising magnets 113 on a face facing the surface of the stator 1 comprising the windings 103, forming a third motor 53.

Figure 10:
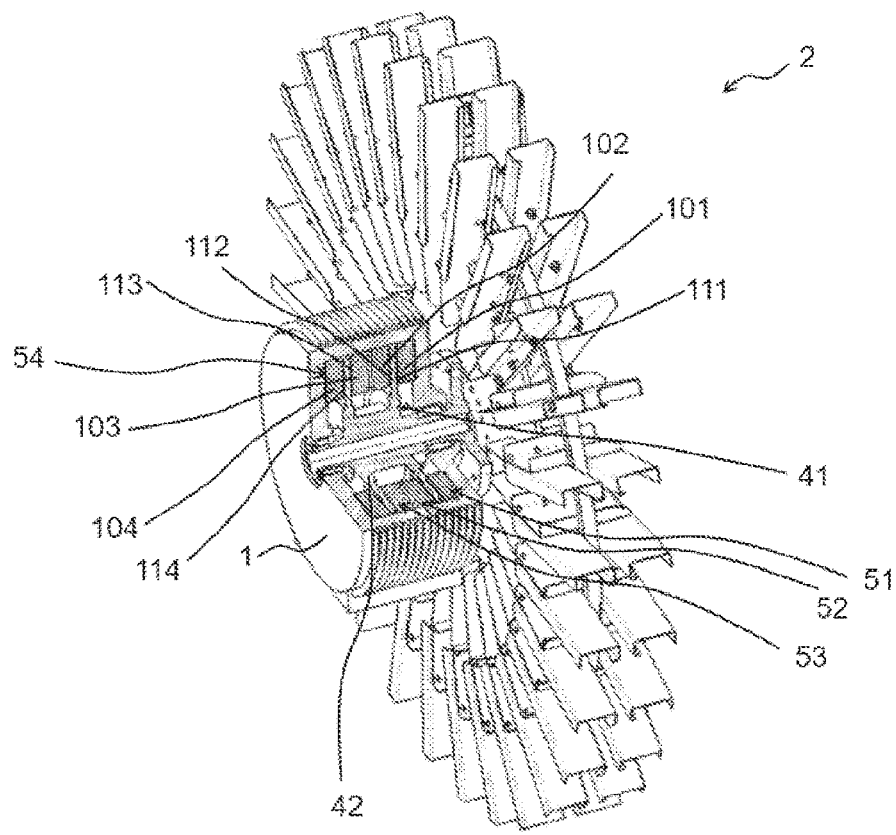
FIG. 10 is a view similar to that of FIGS. 7-9 with four juxtaposed motors.

FIG. 10 shows an embodiment comprising the motors 51 and 52 and a second rotor 42 comprising magnets 113 on a face facing a third surface of the stator 1 comprising the windings 103, forming a third motor 53, and magnets 114 on its opposite face facing a fourth surface of the stator 1 comprising the windings 104, forming a fourth motor 54.

Alternatively, the motors 53 and 54 can be formed by the same set of magnets arranged through the rotor 42 in such a way as to have, each one a north face on one side of the rotor 42 and a south face on the other side of the same rotor 42, by alternating the north and south faces of the adjacent magnets on each side of the rotor.

The number of rotors is purely for the purposes of illustration and is not limiting, those skilled in the art will know how to adapt it according to parameters of the winding device and the required torque.

In the embodiments comprising one or more rotors 41-42 carrying permanent magnets 111-114, the permanent magnet 111-114 advantageously have a substantially trapezoidal shape, with a height that is radially oriented with respect to the axis X, with the narrowest base being positioned closer to the axis X than the widest base. The bases of the magnets can be straight or curved. The permanent magnets can thus be juxtaposed to form a crown coaxial with the axis X, facing windings.

Each motor is controlled by an electronic speed variator (not shown) adapted to vary the voltage, the frequency and the supply current of the windings of the stator 1. Said windings produce a magnetic field rotating at a speed that is proportional to the supply frequency, generating a rotation of the rotor or rotors of which the permanent magnets produce a magnetic field. Advantageously, the current supplying the windings can be controlled, in such a way as to vary the magnetic field and therefore adapt the torque produced by the motor.

The electronic speed variator is part of the control/command system of the winder, which also comprises a processing unit coupled or integrated to the variator for controlling the motor in particular according to the position of the winder and the operating phase.

Said control/command system further comprises sensors adapted for measuring the electric current flowing through the windings of the motor.

The processing unit comprises at least one processor configured to implement calculation algorithms taking account of the input data supplied in particular by the sensors and a memory wherein parameters required for the execution of the algorithms are recorded.

In some embodiments, the processing unit is integrated directly into the variator; in other embodiments, the processing unit is integrated into a programmable logic controller exterior to the variator (for example that of the machine to which the winder is connected).

The processing unit and the variator can be arranged inside a cabinet located in the vicinity of the winder.

An advantage of such a direct drive motor or set of direct drive motors is that it makes it possible to avoid using any transmission element, such as a gearbox, and therefore overcomes all the problems generated by such a gearbox, such as in particular any failures and operating clearances of the gearbox, as well as the losses that it induces via its yield.

Moreover, in such a motor, there is no contact between the rotor and the stator 1. There is therefore no mechanical wear, which generates excellent reliability and a long service life.

On the other hand, such a motor or set of motors makes it possible to generate torques of a short duration that are more substantial than the current asynchronous motor technologies, which is important for making it possible to reduce the braking duration of the winder in an emergency (at a constant power of the motor) or to pass more quickly above the point of supply of the winder, this requiring a strong overtorquing, compared to the torque generated in common use, over a short period (typically less than 5 seconds).

Moreover, the winder according to the invention benefits from the large size of the reel to allow for an arrangement of a large number of permanent magnets, and to place said magnets at a substantial distance from the axis X, in order to procure the desired torque.

For example, there is typically a diameter of about 1.5 m available to arrange the magnets. The rotation speed of the reel is typically about 30 rpm, but can more generally be comprised between a speed of practically zero and 100 rpm. The torque produced by the motor can reach 8000 Nm.

As can be seen in FIGS. 3 to 10, the winder architecture according to the invention lends itself to a certain modularity, in terms of size and/or number of windings as well as in terms of the size of the permanent magnets.

Thus, in the embodiment of FIG. 3, the stator 1 comprises windings 10 having a height h1, the top of the windings in the radial direction being a distance d from the axis X, and the height of the magnets 11 is substantially equal to the total thickness of the winding, the magnets being arranged facing windings.

In the embodiment of FIG. 4, the stator 1 comprises windings 10 that have a height h2 less than h1. Preferably, the top of the windings in the radial direction is the same distance d from the axis X as in the windings of FIG. 3, and the wide base of the magnets 11 is located at the same distance from the axis X as the magnets of the rotor of FIG. 3 so as to maximise the torque generated.

In the embodiment of FIG. 5, the stator 1 comprises windings 10 that have a height h3 less than h2. Preferably, the top of the windings in the radial direction is the same distance d of the axis X as in the windings of FIGS. 3 and 4, and the wide base of the magnets 11 is located at the same distance from the axis X as the magnets of the rotor of FIGS. 3 and 4 so as to maximise the torque generated.

It is possible to adjust the location of the magnets and of the windings with respect to the axis X according to the space available and in particular the dimension of the reel.

It is optionally possible to procure a certain modularity by forming each magnet in the form of two or more trapezoidal portions juxtaposed in the radial direction, of which the sum of the heights forms the total height of the magnet.

Depending on the applications, it is possible to form magnets of a maximum height by using the assembly of the trapezoidal portions, or to form magnets of an minimum or intermediate height by using only a portion of the trapezoidal portions and by arranging them in a crown.

Naturally, the embodiments shown are given only for the purposes of illustration; those skilled in the art can use any other number of turns for the winding and consequently dimension the size and the number of magnets, according to the application and the torque and the required speed. Those skilled in the art can moreover adapt the turns for the winding 101-104 and dimension the size and the number of magnets 111-114 in the same way for an embodiment wherein one or more rotors 41, 42 are integral with the shaft 3 such as shown in FIGS. 6-10. Furthermore, in such an embodiment, the size and the number of the turns for the windings 101-104 and the number of magnets 111-114 can be different or identical for the several motors 51-54 formed by the rotors and the surfaces of the stator 1.

Moreover, although the description was given in reference to an axial flux motor, the motor could, according to an alternative, be a radial flux motor. In this embodiment, the rotor would comprise a drum integral with the mandrel 20 carrying the permanent magnets and the stator 1 would carry windings with three-phase power orienting the field radially. The magnets could be placed inside or outside of the windings.

The invention claimed is:

1. A device for winding/unwinding a link adapted to transport a fluid or transmit energy and/or signals, comprising:
    a reel adapted to receive said link in wound form;
    a hollow through shaft adapted to the passage of the link between a rotary joint and the reel, the hollow shaft being integral with the reel in order to drive said reel in rotation about a longitudinal axis of the hollow though shaft;
    at least one permanent magnet synchronous direct drive motor, comprising a stator carrying windings adapted to be electrically three-phase powered and a rotor carrying permanent magnets facing windings of the stator, at least one rotor of said at least one synchronous motor being formed by a central disc of the reel;
    an electronic speed variator adapted to vary the supply current of the windings of the stator;
    a rotary joint coupled to an end of the hollow through shaft opposite the reel; and
    a control/command system comprising a processing unit coupled or integrated to the electronic speed variator to control each permanent magnet synchronous direct drive motor.

2. The device according to claim 1, wherein each permanent magnet has a trapezoidal shape, the height of each permanent magnet extending radially with respect to the longitudinal axis.

3. The device according to claim 2, wherein the permanent magnets are juxtaposed in order to form a crown.

4. The device according to claim 3, wherein a radial extension of the crown of magnets is substantially equal to a height of the windings.

5. The device according to claim 1, wherein the permanent magnet synchronous direct drive motor is an axial flux motor.

6. The device according to claim 1, wherein the speed processing unit is coupled or integrated to the electronic speed variator to control each permanent magnet synchronous direct drive motor according to a position of a winder and an operating phase.

7. A device for winding/unwinding a link adapted to transport a fluid or transmit energy and/or signals, comprising:
    a reel adapted to receive said link in wound form;
    a hollow through shaft adapted to the passage of the link or the fluid between a rotary joint and the reel, the hollow shaft being integral with the reel in order to drive said reel in rotation about a longitudinal axis of the hollow though shaft;
    at least one permanent magnet synchronous direct drive motor, comprising a stator carrying windings adapted to be electrically three-phase powered and a rotor carrying permanent magnets facing windings of the stator;

at least one rotor of said at least one synchronous motor being rigidly integral with the hollow through shaft;

an electronic speed variator adapted to vary the supply current of the windings of the stator;

the rotary joint coupled to an end of the hollow through shaft opposite the reel; and a control/command system comprising a processing unit coupled or integrated to the electronic speed variator to control each permanent magnet synchronous direct drive motor.

8. The device according to claim 7, wherein the permanent magnets are arranged through said at least one rotor in such a way as to each have a north face on one side of said rotor and a south face on the opposite side of the same rotor.

9. The device according to claim 7, wherein each permanent magnet has a trapezoidal shape, the height of each permanent magnet extending radially with respect to the longitudinal axis.

10. The device according to claim 9, wherein the permanent magnets are juxtaposed in order to form a crown.

11. The device according to claim 10, wherein a radial extension of the crown of magnets is substantially equal to a height of the windings.

12. The device according to claim 7, wherein the permanent magnet synchronous direct drive motor is an axial flux motor.

13. The device according to claim 7, wherein the speed processing unit is coupled or integrated to the electronic speed variator to control each permanent magnet synchronous direct drive motor according to a position of a winder and an operating phase.

* * * * *